H. H. ALLYN.
PNEUMATIC TIRE.
APPLICATION FILED JULY 15, 1921.

1,398,482.

Patented Nov. 29, 1921.

H. H. Allyn, Inventor

By Jesse R. Stone his Attorney

UNITED STATES PATENT OFFICE.

HARLEY H. ALLYN, OF HOUSTON, TEXAS, ASSIGNOR TO STANDARD RUBBER COMPANY, OF HOUSTON, TEXAS, A CORPORATION OF DELAWARE.

PNEUMATIC TIRE.

1,398,482.   Specification of Letters Patent.   Patented Nov. 29, 1921.

Application filed July 15, 1921. Serial No. 485,072.

*To all whom it may concern:*

Be it known that I, HARLEY H. ALLYN, a citizen of the United States, residing at Houston, Harris county, Texas, have invented a certain new and useful Improvement in Pneumatic Tires, of which the following is a full, clear, and exact description, such as will enable others skilled in the art to which it appertains to make and use the same.

My invention relates to an improvement in pneumatic tires for use particularly on the wheels of motor vehicles. It has its principal application to inner tubes to be employed within an outer casing such as is ordinarily used on the present type of motor vehicles.

The object of my invention is to provide an inner tube which will be self-sealing when it has been pierced by some sharp object.

Another object is to provide a self-sealing tube of the type described which is so constructed that the process of manufacture thereof will be simple and easy and the cost of construction small.

Another object is to provide a self-sealing inner tube which will be light in construction and yet strong enough to withstand the wear to which it is ordinarily subjected, and which will not easily pinch in ordinary use or be subject to blow-outs. These, and other objects and advantages will more clearly appear in the specification which follows.

Figure 1:
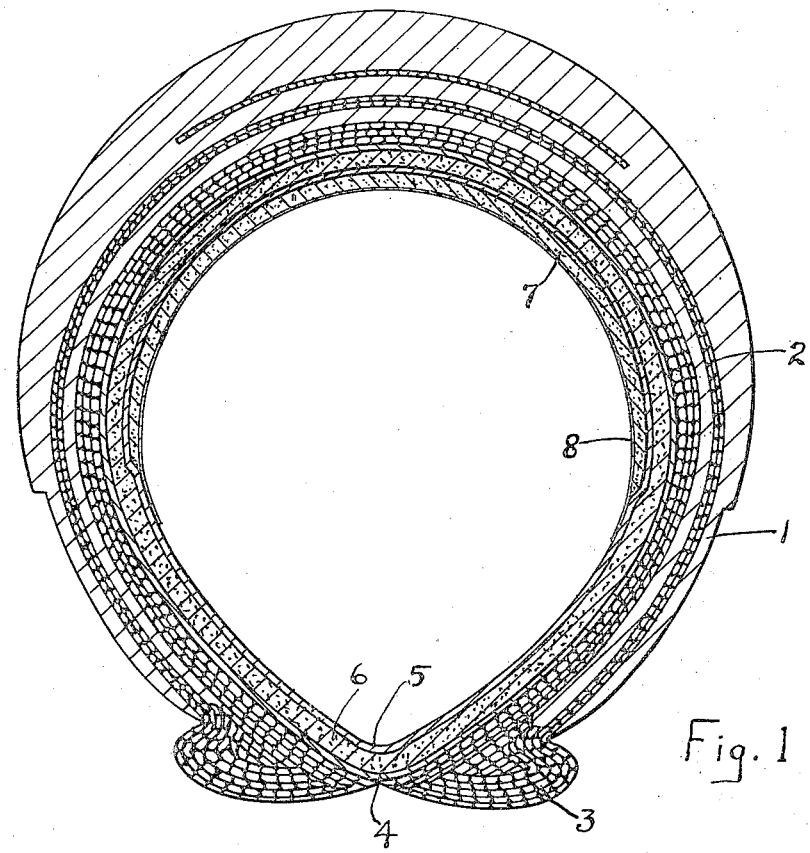
Figure 2:
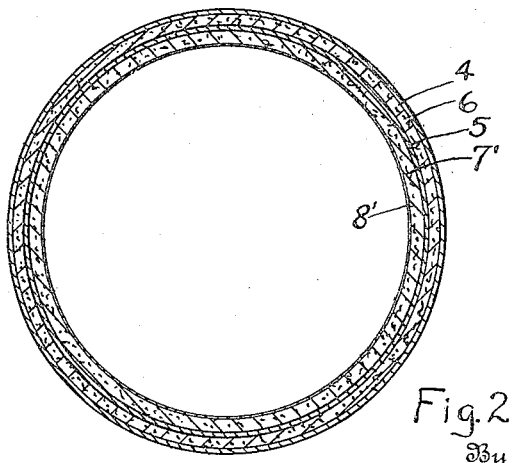

Referring to the drawing herewith, wherein like numerals are applied to like parts in both of the views; Figure 1 is a tranverse section through a vehicle tire equipped with my self-sealing tube. Fig. 2 is a similar section through an inner tube employing a slightly different embodiment of my invention.

In the use of the ordinary type of self-sealing inner tubes it has been customary to provide a layer of gummy or plastic rubber having a vulcanized rubber on both the inner and outer surface. This type of inner tube has been found to be more or less unsatisfactory due to the fact that when a sharp object punctures the tire and projects through into the inner portion thereof, it is found that, when the object is withdrawn the inner layer of hard or vulcanized rubber adheres slightly to the object and is withdrawn with the object into the opening caused by the said object, thus forming a sort of hard lining for the opening thus produced and often acting to prevent the proper sealing of the puncture. The improvement which is the subject matter of this invention has been developed with the object in view of providing a soft inner layer of plastic material which will adhere to the puncturing object and seal the opening when drawn outwardly through the puncture by the said object and yet be sufficiently vulcanized to avoid the usual difficulty caused by the adherence of the inner surfaces to each other when the tire is flat.

In Fig. 1 I have shown an ordinary type of outer casing 1, having embedded therein layers of canvas or fabric 2, and provided with beads 3 by means of which the casing is secured to the rim of the wheel. Within the casing, I have shown an inner tube comprising an outer layer 4 of vulcanized rubber, an inner layer 5 of similar vulcanized rubber, and between these two layers thus provided, a somewhat thicker layer 6 of plastic rubber. This plastic layer is of a special construction which remains somewhat sticky so that when a puncture is made therethrough by some sharp object and the object is withdrawn, the walls of the opening will be forced together and will adhere to each other to close the opening and maintain the tube air-tight.

In addition to the three layers of rubber thus formed, I contemplate placing on the inner surface of the layer 5 of dry rubber an additional layer of soft plastic rubber 7 extending about half way around the tube and on the outer or tread portion of the tire, as shown in Fig. 1. This layer is of the same material as the layer 6 and to prevent the inner surfaces of this layer from adhering together under contact, I have found by experiment that a thin layer of tissue paper 8, preferably crape tissue paper, placed on the inner surface thereof will leave said surface dry and not liable to adhere to the walls of the tire under contact.

Thus, in forming this type of inner tube the layer of crape tissue paper is laid over the mandrel or pole and the layer 7 of plastic rubber is formed on top of this layer of paper. Next above this a thin layer of rubber 5 is formed completely around the pole and the other successive layers are laid on in the same manner. The layers 4 and 5 are formed with sulfur and other vulcanizing material therein so that when the tire is later subjected to heat the two layers 4 and 5 are vulcanized and hence come out from treatment in the usual dry elastic state, leaving the layers of plastic rubber in their original condition.

While in my preferred form I contemplate forming the inner layer 7 of plastic rubber extending only around the outer half of the tube, I may form the same so as to extend completely around the mandrel or pole, as shown in Fig. 2. In this embodiment there is the outer thin vulcanized layer 4, a layer of plastic rubber 6, another layer of hard rubber 5, and, inside of that, a layer of plastic rubber 7' extending completely around the inner surface of the tire. Within the plastic layer 7 is a thin layer of paper 8', also extending completely around the inner surface of the plastic layer 7'.

In the use of this type of inner tube, it will be found that the walls of the tube are sufficiently thick to give it great strength. It will not be liable to pinch under compression but will lay smoothly against the walls of the casing. It is strong and also adapted to sustain heavy pressure of the vehicle so as to avoid to a marked extent the danger of blow-outs when the casing becomes weak. The principal advantage, however, lies in the self-sealing properties which characterize this construction. The thin layer of paper on the inner surface of the plastic layer 7 is such that when the inner tube is inflated and the paper thus stretched to a very thin membrane it will not adhere to an object puncturing the tire and will thus not be drawn into the opening formed by the object and prevent it from properly sealing. Thus, when a nail is driven down through the casing into the inner tube, it will project through into the central chamber. When the object is in this position, the contacting surfaces of the plastic material will prevent air from escaping about the nail. When the nail is then withdrawn the plastic material of the inner layer 7 will adhere to the sides of the nail and a thin film thereof will be withdrawn with the nail and will fill the opening thus formed and adhere together so as to tightly close the said opening and retain the tube in air-tight condition. With this construction large nails or spikes and similar sharp objects may be forced through the tire and withdrawn without appreciable damage to the inner tube and without the loss of air pressure within the tube.

Having thus described my invention, the further objects and advantages of which will be obvious to one skilled in the art, what I claim as new and desire to protect by Letters Patent is:

1. In a vehicle tire, an inner pneumatic tire comprising outer and inner layers of vulcanized rubber, a layer of soft plastic rubber between said outer and inner layers, a fourth layer made up of soft plastic rubber extending part way around the inner peripheral surface of said inner layer and a thin sheet of paper on said last named layer for the purpose described.

2. In a vehicle tire, an inner pneumatic tube comprising an outer layer of vulcanized rubber, an intermediate layer of unvulcanized rubber, a second layer of vulcanized rubber and an inner layer of unvulcanized plastic rubber having a film of paper over its inner surface to prevent sticking.

3. In a vehicle tire, an inner pneumatic tube of rubber having on its inner surface a layer of soft plastic composition with a film of paper on its inner surface to prevent sticking.

In testimony whereof I hereunto affix my signature this the 11th day of July, A. D. 1921.

HARLEY H. ALLYN.